Aug. 4, 1953 — M. FRISCH — 2,647,656
FLUID VESSEL
Filed April 14, 1948 — 2 Sheets-Sheet 1
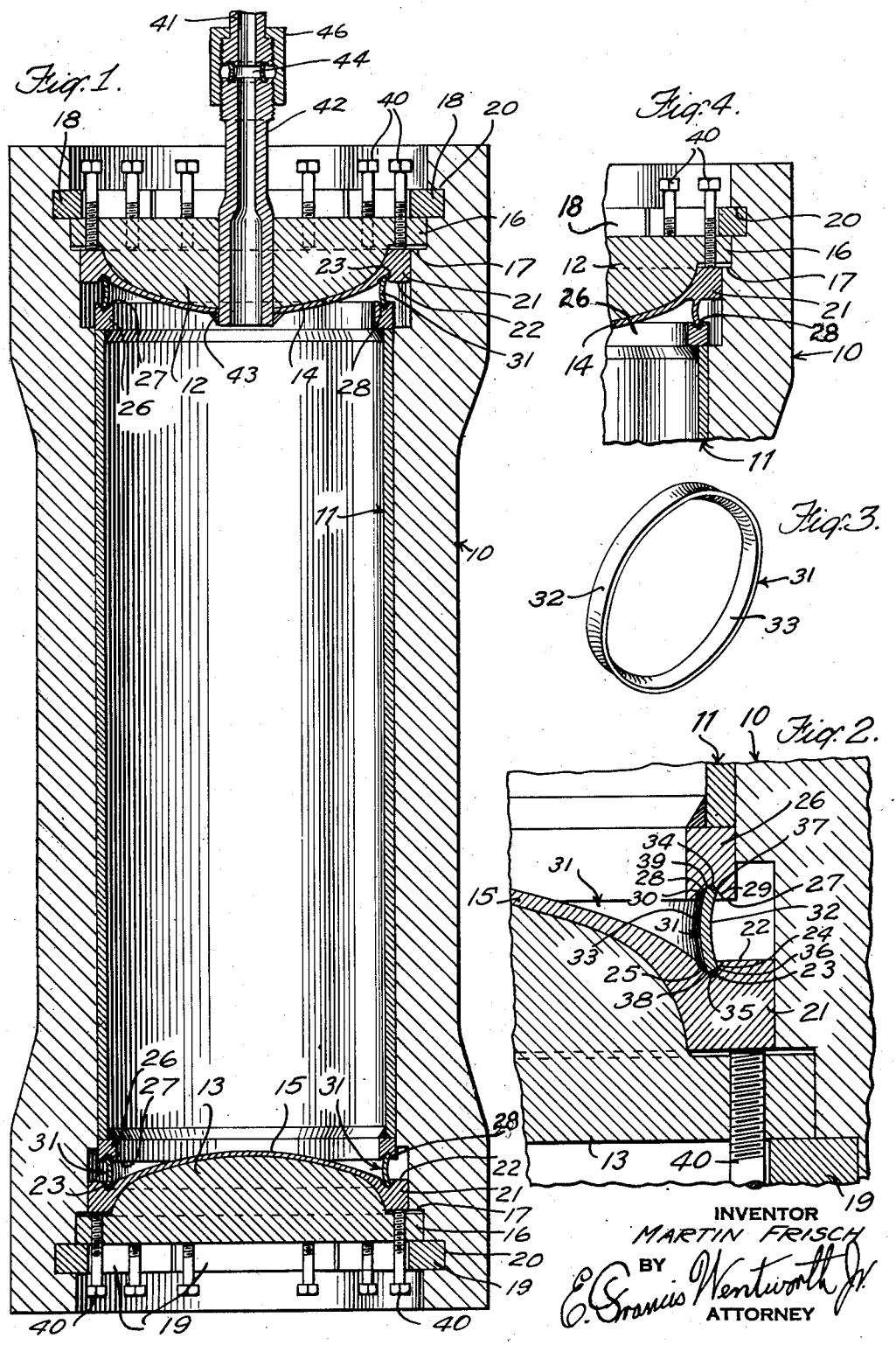
INVENTOR
MARTIN FRISCH
BY
E. Francis Wentworth Jr.
ATTORNEY Aug. 4, 1953
M. FRISCH
2,647,656
FLUID VESSEL
Filed April 14, 1948
2 Sheets-Sheet 2
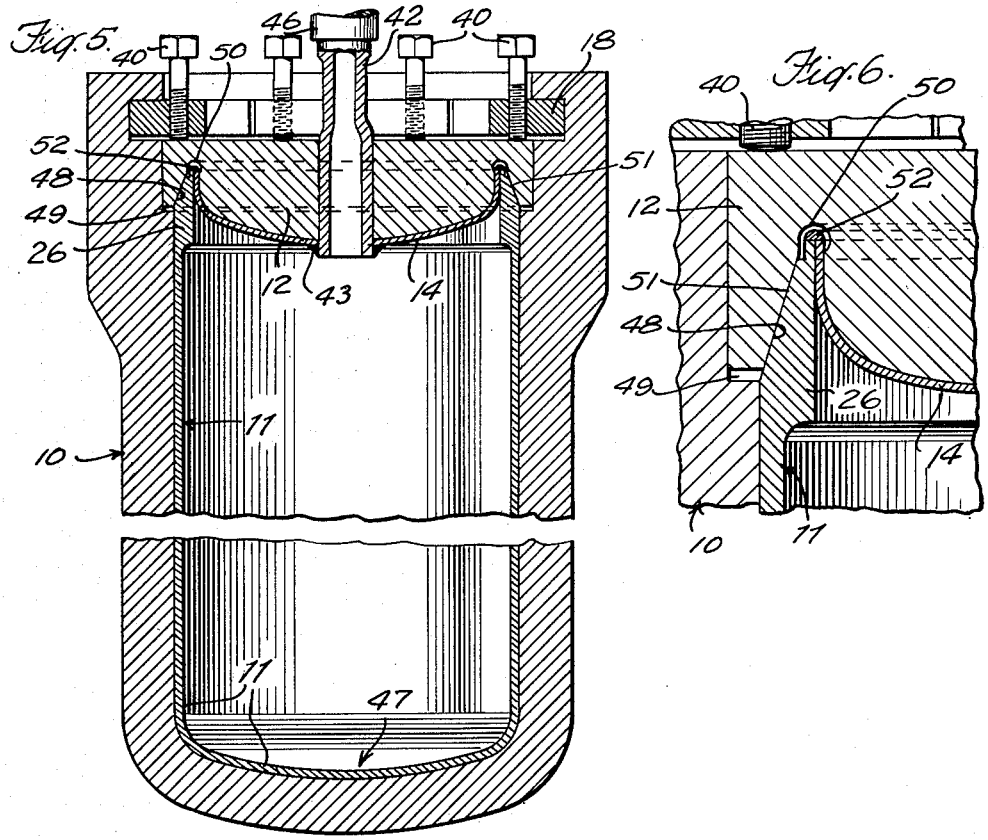
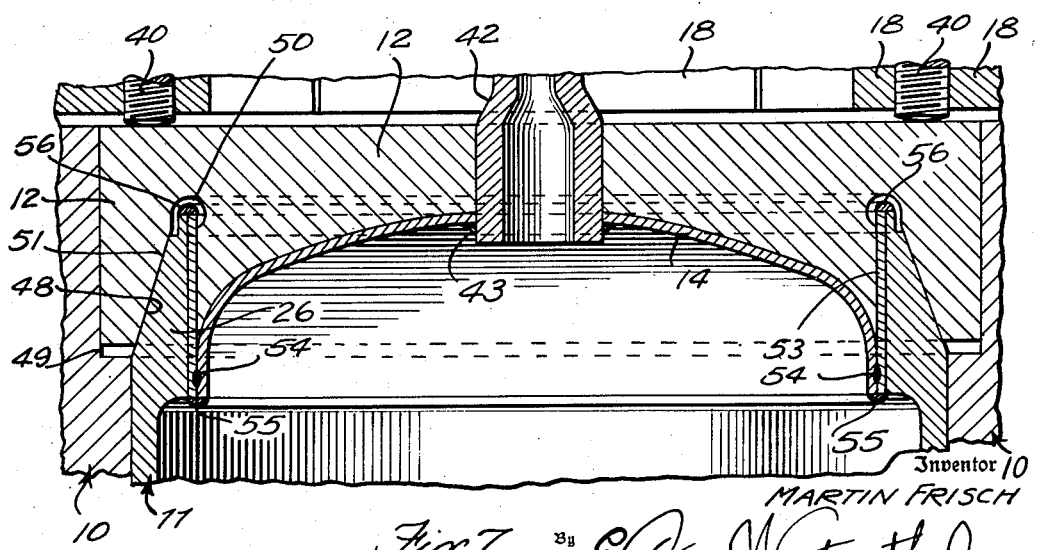
Inventor
MARTIN FRISCH
By E. Francis Wentworth Jr.
Attorney Patented Aug. 4, 1953

2,647,656

UNITED STATES PATENT OFFICE 2,647,656

FLUID VESSEL

Martin Frisch, New York, N. Y., assignor to Foster Wheeler Corporation, New York, N. Y., a corporation of New York Application April 14, 1948, Serial No. 21,081

18 Claims. (Cl. 220—46)

This invention relates to vessels and more particularly to vessels adapted to contain a substance under pressure, a heated substance or a heated substance under pressure and to maintain said heated substance under pressure.

The present invention provides a vessel sealed by sealing means on which means pressure from within the vessel acts to maintain the seal and to tighten said seal upon an increased pressure within the vessel. This invention also provides a sealed vessel in which a replaceable inner lining protects the vessel from corrosion or other attack. The liner is of a material which will deform or expand under the influence of pressure to a greater extent than said vessel so that in operation it will conform to and tightly engage the vessel. Further, by providing such a liner made of an elastic alloy having a greater coefficient of expansion than the material of the vessel the inner lining of the vessel will have a greater rate of expansion than the rate of expansion of the body in response to the temperature of a substance in the container so that the lining will tightly conform to the vessel and the seal between a cover for the opening of the vessel and the lining will be tightened.

The invention will be understood from the following description when considered in connection with the accompanying drawing forming a part thereof and in which:

Fig. 1 is a sectional view of a vessel embodying one embodiment of the present invention;

Fig. 2 is an enlarged sectional view of a portion of the sealing means of the present invention;

Fig. 3 is a perspective view of a sealing gasket;

Fig. 4 is a view similar to Fig. 2 but of another embodiment of the invention;

Fig. 5 is a view similar to Fig. 1 but of another embodiment of the invention;

Fig. 6 is an enlarged sectional view of a portion of the sealing means, and

Fig. 7 is an enlarged view similar to Fig. 5 but of the upper part only of another embodiment of the invention.

Like characters of reference refer to the same parts throughout the several views.

Referring to the drawing, the vessel of the present invention comprises an elongated substantially cylindrically-shaped tubular body member 10 having a cylindrically-shaped tubular liner 11 therein. The liner 11 is of a material which will deform or expand or deform and expand under the influence of pressure to a greater extent than said vessel so that in operation it will conform to and tightly engage the vessel.

The liner may be of an elastic alloy having a greater coefficient of expansion than the material of which body 10 is composed. For example, the body may be of a different metal and of greater thickness or of refractory.

In the embodiment of the invention shown in Fig. 1, the lining 11, which has an outside diameter substantially the same as the diameter of the bore of the vessel, extends axially within the body member to points short of the opposite ends of the body member. Opposite ends of the vessel are closed respectively by heads 12 and 13 which heads are adapted to be located in position on the vessel in a fluid-tight manner. As shown, the heads 12 and 13 have alloy diaphragms 14 and 15 cooperating with the heads respectively. A flat peripheral shoulder 16 extends around heads 12 and 13 the inner surface of the shoulder being adjacent a shoulder 17 on body 10. The heads 12 and 13 are engaged respectively by sectional retaining rings 18 and 19 which rings engage the outer surface of the heads and also a groove 20 in the body member. The diaphragms 14 and 15 each have a shoulder 21 at the periphery thereof which shoulders are adjacent the shoulders 16 of the heads 12 and 13 respectively. Shoulders 21 of the diaphragms 14 and 15 each have an inner face 22 with an annular V-shaped groove 23 therein. Grooves 23 each have opposite plane side walls 24 and 25 which converge toward each other from the face 22 into the shoulder 21 of the diaphragms 14 and 15. Opposite ends of the liner 11 have collars 26 welded thereto, which collars have a face 27 adjacent the faces 22 of the diaphragms 14 and 15. Faces 27 of collars 26 each have an annular substantially V-shaped groove 28 which is concentric to the grooves 23 in said diaphragms. Grooves 28 have opposite plane side walls 29 and 30 which converge from the face 27 into the collars 26 toward each other.

An annular sealing gasket, or ring 31, which ring is of a metal sufficiently flexible to yield within its elastic limit and to react when compression is relieved, is positioned between the grooves 28 in the collars 26 and the grooves 23 in the diaphragms 14 and 15 respectively, the opposite sides of the rings being received by the grooves 23 and 28. As shown the rings 31 are concavo-convex in transverse cross-section, the outer peripheral surface 32 being concave and the inner peripheral surface 33 being convex. The arc in which the surfaces 32 and 33 are formed subtend an angle of less than 180°. The opposite sides 34 and 35 of ring extend radially in respect to the center of curvature of said arc, an outer side edge 36 being formed between the surface 32 and the side 35 and an outer side edge 37 being formed between the surface 32 and the side 34. Inner edges 38 and 39 are likewise formed between the surface 33 and the sides 35 and 34 respectively. When the gaskets 31 are positioned between faces 22 and 27 of the diaphragms 14 and 15 respectively and adjacent collar 26, the edges 36 and 38 engage the side walls 24 and 25 respectively of grooves 23, while the edges 37 and 39 engage side walls 29 and 30 of grooves 28. Set screws 40 extend through the heads 12 and 13 and engage the shoulders 21 of the diaphragms 14 and 15.

As shown, fluid under pressure is conducted through conduit 41 into an inlet conduit 42 extending through the head 12 which inlet conduit is secured to the diaphragm 14 by welding 43. A pipe connection is provided between the conduit 41 and inlet conduit 42 by a gasket 44, which is similar to gasket 31. The gasket engages substantially V-shaped grooves in the opposing faces of the conduits in a manner similar to that which the gasket 31 engages the grooves 28 and 23. Conduits 41 and 42 are held in relation to each other by union sleeve nut 46 which draws the conduits together and brings the opposite sides of the sealing gasket 44 into engagement with the grooves in the opposing faces of the conduits.

In assembling the vessel of the present invention, the liner 11, which fits tightly into the bore of vessel 10, is inserted in the body 10 by heating the body to increase said bore or by chilling liner 11 to decrease the diameter thereof. Upon the body or the liner again assuming its normal temperature after heating or chilling as aforesaid, the outer periphery of liner 11 and peripheral surface of the bore of body 10 will tightly engage one another. The heads 12 and 13 are then positioned in the opposite ends of the body 10 with gaskets 31 disposed between the opposing faces of the collars 26 and the diaphragms 14 and 15 at opposite ends of the liner 11. Retaining rings 18 and 19 are then positioned in the grooves 20 to hold the heads 12 and 13 in position. The joint between the heads 12 and 13 and the opposite ends of the liner 11 is then tightened by tightening the set screws 40 which causes the edges 36 and 38 to be brought tightly into engagement with the side walls 24 and 25 respectively of the grooves 23 and the edges 37 and 39 to be brought into tight engagement with the side walls 29 and 30 of the groove 28.

An increase of internal pressure, temperature or both within the liner 11 will cause the liner to expand both radially and axially. Radial expansion results in deformation of the liner so that it conforms to and tightly engages the peripheral surface of the bore of body member 10 while axial expansion results in tightening the engagement between the edges of the gaskets 31 and the side walls of grooves 28 and 23. Increased pressure also causes the gaskets 31 to be distended axially thereby tightening the engagement between the edges of the gaskets and the side walls of the grooves which said edges engage. Axial expansion of the liner 11 causes the rings 31 to be compressed axially thereby tightening the engagement between the edges of the gaskets and the side walls of the grooves which said edges engage.

The liner 11 of the embodiment of the invention disclosed in Figs. 5 and 6, has an opening at the top only thereof and is continuous at the opposite end to form a closed bottom 47. Collar 26 has a tapered portion 48, which is inclined from the outer periphery thereof at point intermediate the top and the bottom of the collar toward the inner periphery thereof and to the top of said collar. From adjacent the point intermediate the top and bottom of collar 26 to the top of said body 11 the bore of body 10 is of enlarged diameter thereby providing a groove 49 of which tapered portion 48 is the innermost wall. Head 12, which has a convex inner surface and is of substantially the same diameter as said enlarged diameter, has a peripheral groove 50 therein with a tapered side 51, the inclined surface of which parallels tapered portion 48 of collar 26. Diaphragm 14 is preferably of the same material as liner 11.

In assembling the vessel of the embodiment of the invention shown in Figs. 5 and 6, liner 11 is placed within the bore of body 10 in the same manner as hereinbefore set forth in the description of the assembly of the embodiment shown in Fig. 1. Conduit or nozzle 42 is fastened in fluid-tight relationship to diaphragm 14 by welding 43 and diaphragm 14 is thereafter attached in a fluid-tight manner at the periphery thereof to the collar 26 by weld 52 along the upper surface of said collar. Head 12 is then placed in position to close the top of the vessel, the convex surface thereof engaging diaphragm 14 and the upper portion of collar 26, diaphragm 14 and weld 52 extending into groove 50. Tapered portion 48 of collar 26 and tapered side 51 of groove 50 engage one another when head 12 is placed in position on the top of the vessel. The engagement between the convex surface of head 12 and adjacent surface of diaphragm 14, and the adjoining surfaces of tapered portion 48 of collar 26 and tapered side 51 of groove 50 are brought into fluid-tight engagement by tightening set screws 40. The action of pressure and temperature within the vessel would be similar to the action hereinbefore described in connection with the embodiment of the invention disclosed in Fig. 1. Axial expansion of the liner will cause tightening between adjoining surfaces of the head 12 and diaphragm 14 and adjoining surface of tapered portion 48 of collar 26 and tapered side 51 of groove 50.

The head 12 of the embodiment of the invention illustrated in Fig. 7, has a concave inner surface into which diaphragm 14 is placed in a reversed position compared to the position thereof in the embodiment of the invention shown in Figs. 1 and 5. The peripheral edge of the diaphragm 14 is seal welded at 55 to the lower edge of a ring 53. The outside diameter of ring 53, which ring is of a material similar to that of diaphragm 14, is substantially the same as the inside diameter of collar 26 and is seam welded to diaphragm 14 at 54. Ring 53 is attached to the upper edge of collar 26 by weld 56. The assembly and operation of the embodiment of the invention illustrated in Fig. 7 is similar to that of the embodiment of the invention shown in Figs. 5 and 6.

In this manner, a vessel is provided with a replaceable protecting liner and in which the sealing means is caused to seal a joint between a liner in the vessel and a head closing an opening therein which seal becomes more tight as the pressure, the temperature, or the pressure and temperature within the vessel increases.

Since changes may be made in the form, location and relative arrangement of the several parts of the device disclosed without departing from the principles of the invention, it will be understood that the invention is not to be limited excepting by the scope of the appended claims.

What is claimed is:

1. A vessel having a body member with spaced end portions and an intermediate portion therebetween, said body member comprising an outer wall with an inner periphery enclosing a chamber, one of said end portions having an opening therein, closure means removably associated with the opening for closing said opening, a liner positioned within the chamber lining and closely fitting said inner periphery of the outer wall, said liner being expansible radially and longitudinally of the chamber, having a greater rate of expansion than the body member in response to temperature within the chamber, a fluid-tight expansion joint between said closure means and the adjacent end of said liner, said joint having two portions, a receiving portion comprising a groove coextensive with said closure and said adjacent end of the liner, the groove decreasing in width as it increases in depth and a received portion comprising a sealing member coextensive with the groove and so shaped as to project into and engage the sides of the groove, the portions of the joint being so associated with the closure and said adjacent end of the liner respectively that the sealing member and groove are brought into increasingly fluid-tight relationship as said liner expands longitudinally, and means for maintaining the closure in position to close said opening, said means comprising adjusting means acting upon said closure so as to move the closure toward said adjacent end of the lining and thereby bring the sealing member and groove of the expansion joint into increasingly fluid-tight relationship as the closure means is moved toward the lining.

2. A vessel having a body member with spaced end portions and an intermediate portion therebetween, said body member comprising an outer wall with an inner periphery enclosing a chamber, one of said end portions having an opening therein, closure means for closing said opening, a liner positioned within the chamber lining and closely fitting said inner periphery of the outer wall, said liner being expansible radially and longitudinally of the chamber, and having a greater rate of expansion than the body member in response to temperature within the chamber, a fluid-tight expansion joint between said closure means and the adjacent end of said liner, said joint having two portions, a receiving portion comprising a groove coextensive with said closure and said adjacent end of the liner, the groove decreasing in width as it increases in depth and a received portion comprising a sealing member coextensive with the groove and so shaped as to project into and engage the sides of the groove, the portions of the joint being so associated with the closure and said adjacent end of the liner respectively that the sealing member and groove are brought into increasingly fluid-tight relationship as said liner expands longitudinally, and means for maintaining the closure in position to close said opening.

3. A vessel having a body member with spaced end portions and an intermediate portion therebetween, said body member comprising an outer wall with an inner periphery enclosing a chamber, one of said end portions having an opening therein, closure means for closing said opening, a liner positioned within the chamber lining and closely fitting said inner periphery of the outer wall, said liner being expansible radially and longitudinally of the chamber, and having a greater rate of expansion than the body member in response to temperature within the chamber, a diaphragm cover closing said opening and said chamber and adapted to engage the closure, the cover being secured in a fluid-tight manner at the periphery thereof to the liner, said closure means having a groove therein into which the adjacent end of the liner moves upon longitudinal expansion of said liner, and means for maintaining the closure means in position to close said opening and the chamber.

4. A vessel having a body member with spaced end portions and an intermediate portion therebetween, said body member comprising an outer wall with an inner periphery enclosing a chamber, one of said end portions having an opening therein, closure means for closing said opening, a liner positioned within the chamber lining and closely fitting said inner periphery of the outer wall, said liner being expansible radially and longitudinally of the chamber, and having a greater rate of expansion than the body member in response to temperature within the chamber, a diaphragm cover of the same material as said liner closing said opening and said chamber and adapted to engage the closure, the cover being secured in a fluid-tight manner at the periphery thereof to the liner, said closure means having a groove therein into which the adjacent end of the liner moves upon longitudinal expansion of said liner, and means for maintaining the closure means in position to close said opening and the chamber.

5. A vessel having a body member with spaced end portions and an intermediate portion therebetween, said body member comprising an outer wall with an inner periphery enclosing a chamber, one of said end portions having an opening therein, a liner positioned within the chamber lining and closely fitting said inner periphery of the outer wall, said liner being expansible radially and longitudinally of the chamber, and having a greater rate of expansion than the body member in response to temperature within the chamber, closure means at said one end of the body member and adapted to close said opening, the closure means having a continuous groove therein in alignment with the adjacent end of said liner, said closure means being so positioned in relationship to the body member that said adjacent end of the liner upon longitudinal expansion thereof moves into said groove, a diaphragm cover closing said opening and the chamber and adapted to tightly engage the closure means, the diaphragm having a peripheral rim extending in a plane transverse to the plane of the central portion of said diaphragm, said rim being welded in a fluid-tight manner to the adjacent end of said liner and arranged to move into said groove with the adjacent end of the liner upon longitudinal expansion of the liner, and means for maintaining the closure in position to close said opening and the chamber.

6. A vessel having a body member with spaced end portions and an intermediate portion therebetween, said body member comprising an outer wall with an inner periphery enclosing a chamber, one of said end portions having an opening therein, a liner positioned within the body member extending to a point adjacent one end thereof lining and closely fitting the inner periphery of the outer wall, said liner being expansible radially and longitudinally of the chamber, and having a greater rate of expansion than the body member in response to temperature within the chamber, closure means at said one end of the body member and adapted to close said opening, the closure means having a continuous groove therein in alignment with the adjacent end of said liner, said closure means being normally so positioned in relationship to the body member that the adjacent end of the liner projects into said groove to a point short of the bottom thereof and the inner surface of said closure extends into said opening, a diaphragm cover closely fitting said inner surface of the closure and closing said opening, the diaphragm having a peripheral rim extending in a plane transverse to the plane of the central portion of said diaphragm, said rim being welded in a fluid-tight manner to the adjacent end of said liner and arranged to extend into said groove, and means for maintaining the closure in position to close said opening and the chamber.

7. A vessel having a body member with spaced end portions and an intermediate portion therebetween, said body member comprising an outer wall with an inner periphery enclosing a chamber, one of said end portions having an opening therein, a liner positioned within the body member extending to a point adjacent one end thereof lining and closely fitting the inner periphery of the outer wall, said liner being expansible radially and longitudinally of the chamber, and having a greater rate of expansion than the body member in response to temperature within the chamber, closure means at said one end of the body member and adapted to close said opening, the closure means having a continuous groove therein in alignment with the adjacent end of said liner, said closure means being normally so positioned in relationship to the body member that the adjacent end of the liner projects into said groove to a point short of the bottom thereof and the inner surface of said closure extends into said opening, the outer periphery of said one end of the liner and the adjoining side of said groove being in engagement with one another and inclined toward said bottom of the groove, a diaphragm cover closely fitting said inner surface of the closure and closing said opening, the diaphragm having a peripheral rim extending in a plane transverse to the plane of the central portion of said diaphragm, said rim being welded in a fluid-tight manner to the adjacent end of said liner and arranged to extend into said groove, and means for maintaining the closure in position to close said opening and the chamber.

8. A vessel having a body member with spaced end portions and an intermediate portion therebetween, said body member comprising an outer wall with an inner periphery enclosing a chamber, one of said end portions having an opening therein, a liner positioned within the body member extending to a point adjacent one end thereof lining and closely fitting the inner periphery of the outer wall, said liner being expansible radially and longitudinally of the chamber, and having a greater rate of expansion than the body member in response to temperature within the chamber, closure means having a convex inner surface, the closure means being positioned at one end of the body member and adapted to close said opening, the closure means having a continuous groove therein in alignment with the adjacent end of said liner, said closure means being normally so positioned in relationship to the body member that the adjacent end of the liner projects into said groove to a point short of the bottom thereof and the inner surface of said closure extends into said opening, a diaphragm cover closely fitting said inner surface of the closure and closing said opening, the diaphragm having a peripheral rim extending in a plane transverse to the plane of the central portion of said diaphragm, said rim being welded in a fluid-tight manner to the adjacent end of said liner and arranged to extend into said groove, and means for maintaining the closure in position to close said opening and the chamber.

9. A vessel having a body member with spaced end portions and an intermediate portion therebetween, said body member comprising an outer wall with an inner periphery enclosing a chamber, one of said end portions having an opening therein, a liner positioned within the body member extending to a point adjacent one end thereof lining and closely fitting the inner periphery of the outer wall, said liner being expansible radially and longitudinally of the chamber, and having a greater rate of expansion than the body member in response to temperature within the chamber, closure means having a convex inner surface, the closure means being positioned at one end of the body member and adapted to close said opening, the closure means having a continuous groove therein in alignment with the adjacent end of said liner, said closure means being normally so positioned in relationship to the body member that the adjacent end of the liner projects into said groove to a point short of the bottom thereof and the inner surface of said closure extends into said opening, the outer periphery of said one end of the liner and the adjoining side of said groove being in engagement with one another and inclined toward said bottom of the groove, a diaphragm cover closely fitting said inner surface of the closure and closing said opening, the diaphragm having a peripheral rim extending in a plane transverse to the plane of the central portion of said diaphragm, said rim being welded in a fluid-tight manner to the adjacent end of said liner and arranged to extend into said groove, and means for maintaining the closure in position to close said opening and the chamber.

10. A vessel having a body member with spaced end portions and an intermediate portion therebetween, said body member comprising an outer wall with an inner periphery enclosing a chamber, one of said end portions having an opening therein, a liner positioned within the body member extending to a point adjacent one end thereof lining and closely fitting the inner periphery of the outer wall, said liner being expansible radially and longitudinally of the chamber, and having a greater rate of expansion than the body member in response to temperature within the chamber, closure means having a concave inner surface, the closure means being positioned at one end of the body member and adapted to close said opening, the closure means having a continuous groove therein in alignment with the adjacent end of said liner, said closure means being normally so positioned in relationship to the body member that the adjacent end of the liner projects into said groove to a point short of the bottom thereof and the inner surface of said closure extends into said opening, a diaphragm cover closely fitting said inner surface of the closure and closing said opening, the diaphragm having a peripheral rim extending in a plane transverse to the plane of the central portion of said diaphragm, said rim being welded in a fluid-tight manner to the adjacent end of said liner and arranged to extend into said groove, and means for maintaining the closure in position to close said opening and the chamber.

11. A vessel having a body member with spaced end portions and an intermediate portion therebetween, said body member comprising an outer wall with an inner periphery enclosing a chamber, one of said end portions having an opening therein, a liner positioned within the body member extending to a point adjacent one end thereof lining and closely fitting the inner periphery of the outer wall, said liner being expansible radially and longitudinally of the chamber, and having a greater rate of expansion than the body member in response to temperature within the chamber, closure means having a concave inner surface, the closure means being positioned at one end of the body member and adapted to close said opening, the closure means having a continuous groove therein in alignment with the adjacent end of said liner, said closure means being normally so positioned in relationship to the body member that the adjacent end of the liner projects into said groove to a point short of the bottom thereof and the inner surface of said closure extends into said opening, the outer periphery of said one end of the liner and the adjoining side of said groove being in engagement with one another and inclined toward said bottom of the groove, a diaphragm cover closely fitting said inner surface of the closure and closing said opening, the diaphragm having a peripheral rim extending in a plane transverse to the plane of the central portion of said diaphragm, said rim being welded in a fluid-tight manner to the adjacent end of said liner and arranged to extend into said groove, and means for maintaining the closure in position to close said opening and the chamber.

12. A vessel having a body member with spaced end portions and an intermediate portion therebetween, said body member comprising an outer wall with an inner periphery enclosing a chamber, one of said end portions having an opening therein, a liner positioned within the chamber lining and closely fitting said inner periphery of the outer wall, said liner being expansible radially and longitudinally of the chamber, and having a greater rate of expansion than the body member in response to temperature within the chamber, the liner having a face adjacent the opening with a continuous groove therein shaped to provide wall portions extending at an angle to the face toward a point in a plane intersecting the groove and extending normally to the face, closure means for closing said opening in the vessel, a sealing ring generally of the same circumferential size and shape as said groove, said ring having a concave outer surface and a convex inner surface and being associated with the closure means and the groove so that expansion of the liner longitudinally causes the ring to be compressed axially and pressure within the chamber causes the ring to be distended axially, the edge of a side of the ring engaging the wall of the groove, and means for maintaining the closure in a position to close the opening and the chamber and for maintaining said edge of the ring and the wall of the groove adjacent thereto in engagement.

13. A vessel having a body member with spaced end portions and an intermediate portion therebetween, said body member comprising an outer wall with an inner periphery enclosing a chamber, each of said end portions having an opening therein, a liner positioned within the chamber lining and closely fitting said inner periphery of the outer wall, said liner being expansible radially and longitudinally of the chamber and having a greater rate of expansion than the body member in response to temperature within the chamber, the closure means and the liner having adjacently opposed faces with a continuous groove in each thereof adjacent each opening, each of said faces of the liner and closure means having a continuous groove therein shaped to provide wall portions extending at an angle to the face toward a point in a plane intersecting the groove and extending normally to the face, closure means for closing each of said openings in the vessel, sealing rings generally of the same circumferential size and shape as said grooves, said rings having a concave outer surface and a convex inner surface and being positioned between said adjacently opposed faces to cooperate with the grooves therein, said rings being of such dimension axially thereof as to maintain said opposed faces in spaced relationship so that longitudinal expansion of the liner causes the rings to be compressed axially and pressure within the chamber causes the rings to be distended axially, the edge of a side of the ring engaging a wall of the grooves, and means for maintaining the closures in a position to close the openings and the chamber and for maintaining said edge of the ring and the wall of the grooves adjacent thereto in engagement.

14. A vessel having a body member with spaced end portions and an intermediate portion therebetween, said body member comprising an outer wall with an inner periphery enclosing a chamber, one of said end portions having an opening therein, a liner positioned within the chamber lining and closely fitting said inner periphery of the outer wall, said liner being expansible radially and longitudinally of the chamber, and having a greater rate of expansion than the body member in response to temperature within the chamber, the liner having a face adjacent the opening with a continuous groove therein shaped to provide wall portions extending at an angle to the face toward a point in a plane intersecting the groove and extending normally to the face, closure means for closing said opening in the vessel comprising a head, a diaphragm associated with the head, and a sealing ring generally of the same circumferential size and shape as said groove, said ring being of such dimension axially thereof as to maintain said opposed faces in spaced relationship and having a concave outer surface and a convex inner surface and being associated with the diaphragm in a fluid-tight manner and with the groove so that expansion of the liner causes the ring to be compressed axially and pressure within the chamber causes the ring to be distended axially, the edge of a side of the ring engaging the wall of the groove, a retaining ring cooperating with the body of the vessel and the head to maintain the head in a closed position in respect to the opening, and set screws associated with the head and engaging the diaphragm for adjusting the engaging pressure between said edge of the ring and the adjacent wall of the groove.

15. A vessel having a body member with spaced end portions and an intermediate portion therebetween, said body member comprising an outer wall with an inner periphery enclosing a chamber, one of said end portions having an opening therein, a liner positioned within the chamber lining and closely fitting said inner periphery of the outer wall, said liner being expansible radially and longitudinally of the chamber, and having a greater rate of expansion than the body member in response to temperature within the chamber, closure means for closing the opening in the vessel, means for maintaining the closure means in closed position in respect to said opening, the closure means and the liner having adjacently opposed faces with a continuous groove in each thereof shaped to provide wall portions extending at an angle to the face toward a point in a plane intersecting the groove and extending normally to the face, said grooves having substantially the same dimensions and disposed in substantial coaxial relationship in said faces adjacent said opening, and a sealing ring having a concave outer surface and a convex inner surface, the ring being positioned between the faces and having such dimension axially thereof as to maintain said opposed faces in spaced relationship so that the ring is acted upon by the pressure in the chamber and distended axially by said pressure, the edge of a side of the ring engaging the wall of the groove adjacent said edge.

16. A vessel having a body member with spaced end portions and an intermediate portion therebetween, said body member comprising an outer wall with an inner periphery enclosing a chamber, one of said end portions having an opening therein, a liner positioned within the chamber lining and closely fitting said inner periphery of the outer wall, said liner being expansible radially and longitudinally of the chamber, and having a greater rate of expansion than the body member in response to temperature within the chamber, closure means for closing the opening in the vessel, means for maintaining the closure means in closed position in respect to said opening, the closure means and the liner having adjacently opposed faces with a continuous groove in each thereof shaped to provide wall portions extending at an angle to the face toward a point in a plane intersecting the groove and extending normally to the face, said grooves having substantially the same dimensions and disposed in substantial coaxial relationship in said faces adjacent said opening, and a sealing ring having a concave outer surface and a convex inner surface, the ring being positioned between the faces and having such dimension axially thereof as to maintain said opposed faces in spaced relationship so that the ring is acted upon by the pressure in the chamber and distended axially by said pressure, the edges only of the opposite sides of the ring engaging the wall portions of the grooves.

17. A vessel having a body member with spaced end portions and an intermediate portion therebetween, said body member comprising an outer wall with an inner periphery enclosing a chamber, one of said end portions having an opening therein, a liner positioned within the chamber lining and closely fitting said inner periphery of the outer wall, said liner being expansible radially and longitudinally of the chamber, and having a greater rate of expansion than the body member in response to temperature within the chamber, closure means for closing the opening in the vessel, means for maintaining the closure means in a position to close said opening, the liner having a face adjacent the opening with a continuous groove therein shaped to provide wall portions extending at an angle to the face toward a point in a plane intersecting the groove and extending normally to the face, and a sealing ring generally of the same circumferential size and shape as said groove, said ring having a concave outer surface and a convex inner surface and being formed integrally with said closure means and engaging the groove, the ring having such dimension axially thereof as to maintain said opposed faces in spaced relationship so that the ring is acted upon by the pressure in the chamber and distended axially by said pressure, the edge of a side of the ring engaging the wall of the groove adjacent to said edge.

18. A vessel having a body member with spaced end portions and an intermediate portion therebetween, said body member comprising an outer wall with an inner periphery enclosing a chamber, one of said end portions having a opening therein, closure means removably associated with the opening for closing said opening, a liner positioned within the chamber lining and closely fitting said inner periphery of the outer wall, said liner being expansible radially and longitudinally of the chamber and having a greater rate of expansion than the body member in response to temperature within the chamber, a fluid-tight expansion joint between said closure means and the adjacent end of said liner, said joint having two portions, a receiving portion comprising a groove coextensive with said closure and said adjacent end of the liner, the groove decreasing in width as it increases in depth and a received portion comprising a sealing member coextensive with the groove and so shaped as to project into and engage the sides of the groove, the portions of the joint being so associated with the closure and said adjacent end of the liner respectively that the sealing member and groove are brought into increasingly fluid-tight relationship as said liner expands longitudinally, and means for maintaining the closure in position to close said opening, said means comprising a plurality of adjusting screws acting upon said closure so as to move the closure toward said adjacent end of the lining and thereby bring the sealing member and groove of the expansion joint into increasingly fluid-tight relationship as the closure means is moved toward the lining.

MARTIN FRISCH.

References Cited in the file of this patent

UNITED STATES PATENTS

| Number | Name | Date |
|---|---|---|
| 1,773,199 | Price | Aug. 19, 1930 |
| 1,883,662 | Fischer | Oct. 18, 1932 |
| 1,897,213 | Price | Feb. 14, 1933 |
| 2,028,967 | Carlstrom | Jan. 28, 1936 |
| 2,296,620 | Tinker | Sept. 22, 1942 |
| 2,303,114 | Egger | Nov. 24, 1942 |
| 2,339,876 | Phillips | Jan. 25, 1944 |
| 2,360,391 | Birchall | Oct. 17, 1944 |
| 2,413,308 | Arnold | Dec. 31, 1946 |
| 2,435,251 | Tome | Feb. 3, 1948 |

FOREIGN PATENTS

| Number | Country | Date |
|---|---|---|
| 213,355 | Great Britain | Apr. 3, 1924 |
| 691,144 | Germany | May 17, 1940 |